United States Patent [19]
Chou

[11] 4,126,045
[45] Nov. 21, 1978

[54] REMOTE SPEEDOMETER-TACHOMETER

[76] Inventor: Wayne W. Chou, 19 Sea Beach Dr., Stamford, Conn. 06902

[21] Appl. No.: 850,783

[22] Filed: Nov. 11, 1977

[51] Int. Cl.$^2$ ............................ G01P 3/42; G01S 9/66
[52] U.S. Cl. ........................................ 73/488; 73/506; 324/160; 340/3 D
[58] Field of Search .................. 73/488, 506; 340/3 D, 340/5 S; 324/160, 166

[56] References Cited

U.S. PATENT DOCUMENTS

| | | | |
|---|---|---|---|
| 3,182,283 | 5/1965 | Ellingson et al. | 340/3 D |
| 3,815,426 | 6/1974 | Rohner | 73/488 |

Primary Examiner—James J. Gill
Attorney, Agent, or Firm—Joseph Levinson

[57] ABSTRACT

A remote speedometer-tachometer for the measurement of the rpm's of an engine and the speed of the craft containing the engine is provided, having first and second adjustable voltages which are related to the pitch of the engine with the sound moving toward and away from an observer. A multiplier is provided for modulating the first voltage by the second voltage and applying the output therefrom to an oscillator for controlling the frequency of the oscillator. An output transducer means is coupled to the oscillator, making it possible for the observer by adjusting the first and second voltages to match the output of the transducer with that of the sound from the engine, the settings of said first and second voltages being calibrated to provide the speed of the craft in which the engine is mounted and/or rpm measurement for the engine.

4 Claims, 3 Drawing Figures

REMOTE SPEEDOMETER-TACHOMETER

BACKGROUND OF THE INVENTION

This invention relates to a simple but accurate remote speedometer-tachometer for measuring the speed of a craft and/or revolutions per minute of an engine mounted in said craft which produces a characteristic audible output pulse therefrom.

There are many types of speedometers and tachometers which physically attach to the engine in some manner to provide revolutions per minute (RPM) and speed indications. There are many applications, however, where direct physical attachment is either impossible or impractical, and these applications generally relate to those uses which require remote measurements. In order to make the remote measurements using very simple types of equipment, such systems are plagued with noise of various types, whether audible, inaudible, random or coherent, which prevent proper and accurate measurement. In light-operated tachometers, for example, stray light reflections and varying shadows, particularly, make low frequency measurements difficult. Microphone-operated tachometers, in which the output signal of the microphone used to monitor the exhaust of an engine or some other sound from the engine, are susceptible to interference from external sounds other than that of the engine being tested. In order to reduce such interference, the system for processing the signals generated by the tachometer would of necessity approach in sophistication that of a small computer to alleviate some of the interference problems. Remote speedometers usually involve radar or micorwave units which are expensive and do not measure rpm's.

Accordingly, it is an object of the present invention to provide a remote speedometer-tachometer which is simple, easy to operate, and provides a relatively accurate means for measuring the rpm's of an engine and/or the speed of the craft containing the engine.

Another object of this invention is to provide a new and novel remote speedometer-tachometer requiring no physical contact between the measuring instrument and the source being measured.

A further object of this invention is to provide a remote speedometer-tachometer in which the speed and/or RPM's can be measured from a single position with a small portable instrument.

Still a further object of this invention is to provide a remote speedometer-tachometer where the measurements can be made even in a field with high interference levels.

SUMMARY OF THE INVENTION

In carrying out this invention in one illustrative embodiment thereof, an oscillator is provided for generating outputs which are narrow in duration, and a multiplier means is provided for controlling the output of the oscillator. First and second adjustable and settable voltages, which are related to the pitch of the sound of the engine on which measurements are being made, are applied to the multiplier for modulating the first voltage by the second voltage, the output of which controls the output of the oscillator, which is applied to a transducer. By matching the sounds from the oscillator with that of the source as the source is moving toward and away from the oscillator, and ratioing the pitches obtained in these matches, speed of the craft is provided. A match in pitch with the oscillator from a stationary engine provides an RPM measurement for the engine.

DESCRIPTION OF THE PREFERRED EMBODIMENTS

Before describing the present invention, it should be stated that the principle of the present invention is based on having some type of fixed sound source which travels at the same velocity as the craft whose speed is to be measured. The sound from the engine may be one source which may be utilized for this purpose. Furthermore, as long as there is a distinct audible pulse which can be readily associated with the mechanical rotation of the engine, which again can be the exhaust pulse, then the invention can be applied to measure its rpm. All piston, deisel, rotary type engines produce characteristic exhaust output pulses which may be used for the purposes of the present invention. A pulse jet engine on which measurements of rpm's is not applicable would provide an output pulse per firing. In measuring the speed of the craft under observation, the invention utilizes the well known Doppler Effect, in which there is an apparent increase in pitch of the sound source as it approaches the observer making the measurement, and an apparent decrease in the pitch of the sound as it moves away from the observer. It can be shown, provided the velocity of the source as well as its pitch is constant, then $$P_t/P_a = V_m + V_s/V_m - V_s$$

where
$P_t$ = pitch at the observer with the source moving toward the observer,
$P_a$ = pitch at the observer with the source moving away from the observer,
$V_s$ = velocity of the sound source,
$V_m$ = Velocity of sound in the medium in which the measurement is being made.

It will be noted that for every particular velocity of the source in a given medium, there is a unique ratio of pitches, making it unnecessary to determine the numerical values of the pitches, but only the ratio. Whereas the numerical value of the pitch is important in measuring the rpm's of an engine, it is clear that the requirement for measuring the rpm's is not useful in determining the velocity of the craft. However, the capability of the instrument in measuring both the rpm's and the speed provides the instrument with greater capabilities and broader applications.

Figure 1:
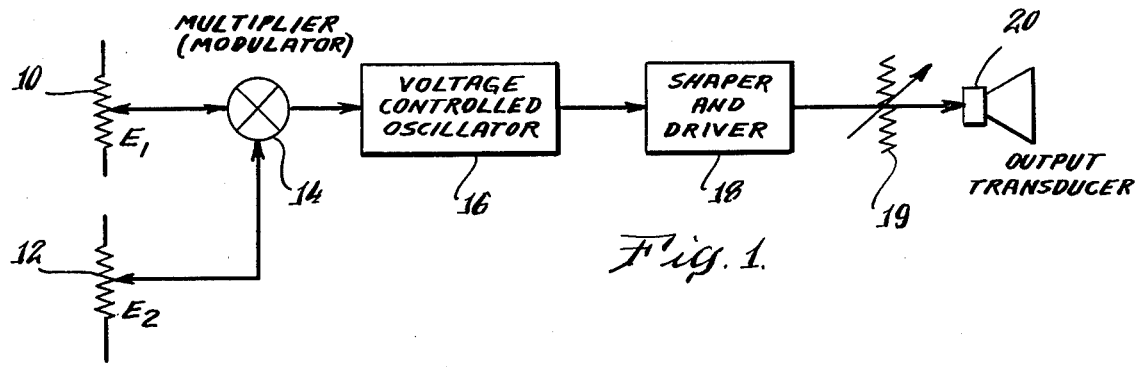
FIG. 1 is a simplified block diagram of a portable remote speedometer-tachometer in accordance with the present invention.

Referring now to the block diagram of FIG. 1, an input voltage $E_1$ taken from a potentiometer 10 is modulated by an input voltage $E_2$ taken from a potentiometer 12 by a multiplier 14. The multiplier 14 modulates the voltage $E_1$ by the voltage $E_2$, with the output being applied to a voltage-controlled oscillator 16. The output of the voltage-controlled oscillator 16 is applied to a shaper and a driver 18 through a volume-control potentiometer 19 to an output transducer 20. Accordingly, the output of the multiplier 14 controls the oscillator 16, which in turn drives the output transducer 20. By properly adjusting the input voltages $E_1$ and $E_2$ by potentiometers 10 and 12 respectively, where $E_1 = f(P_t)$ and $E_2 = f(P)$, the output from the transducer 20 can be matched with the sound of any given source. The potentiometers 10 and 12 can be calibrated against the slider positions to indicate the pitch which is directly related to the rpm's of the engine under observation. In the example shown in FIG. 1, with a calibrated fixed value of $E_2$, calibrations of $E_1$ could be marked in rpm's, since the pitch of the exhaust of an engine which is stationary is proportional to the rpm's of the engine. In measuring the speed of the craft or engine in relation to the observer, the value of $E_2$ is set to satisfy the calibrations of a stationary source. $E_2$ is adjusted by the potentiometer 12 in which the appropriate markings for the slider may be indicated in knots or miles per hour, where the particular position of the slider which provides proper calibration for the potentiometer 10 would be marked zero (speed). In a practical application, the source of a given pitch approaches the observer. The value of $E_1$ is adjusted without regard to the calibrated markings, since they are only meaningful for a stationary object, so that the pitch of the output transducer 20 is the same as that of the approaching source. When the source has passed and is moving away from the observer, potentiometer 12, or voltage $E_2$, is adjusted to produce the lower pitch. If the pitch is again matched by means of the potentiometer 12, and provided that the multiplier 14 is constant for all values of $E_1$, the change in $E_2$ will produce a percentage change of the output of the multiplier 14. For a given input $E_2$ the percentage change is unique and constant for any value of $E_1$. Accordingly, since the frequency of the oscillator 16 is controlled by the output of the multiplier 14, it is clear that although the initial pitch $P_t$ is set by input $E_1$, with $E_2$ at the initial setting representing zero speed, the change of $E_2$ from the initial position to produce the second pitch $P_a$ actually represents the ratio of one pitch to the other. Hence, for a given medium, the equation set forth above can be satisfied by a change in input $E_2$ from the initial to a second value. Appropriate markings of specific values for miles per hour can be placed on the dial of the potentiometer 12 for providing an indication of the speed of the craft being observed.

In order to facilitate the pitch-matching process for the observer, the output of the oscillator is shaped so that when it is fed through the transducer 20 it resembles the sound of the actual source from the engine. The shaper and driver 18 performs this function. Also, it is desirable to provide a volume control such as the potentiometer 19 so that the loudness of the transducer may be adjusted to approximately equal the loudness of the source. By so doing, both the source and the output of the transducer can easily be heard, facilitating the zero beat method of pitch matching. In the alternative, a simple cover could be placed over the transducer, which would in effect smother or attenuate the output sound of the transducer 20, depending on the positioning of the cover. With repsect to the type of electrical signal which must be generated to simulate the sound of the actual source of the engine, this process will depend greatly on the type of source being matched by the output of the transducer. For exhaust outputs of engines, the exhaust pulses are narrow in duration and laden with harmonics, and accordingly sine wave type oscillators are unsuitable for this type of application. For these types of applications, free running blocking oscillators and/or an astable multivibrator, which is illustrated in FIG. 2, are adequate for all but the most specialized applications.

Figure 2:
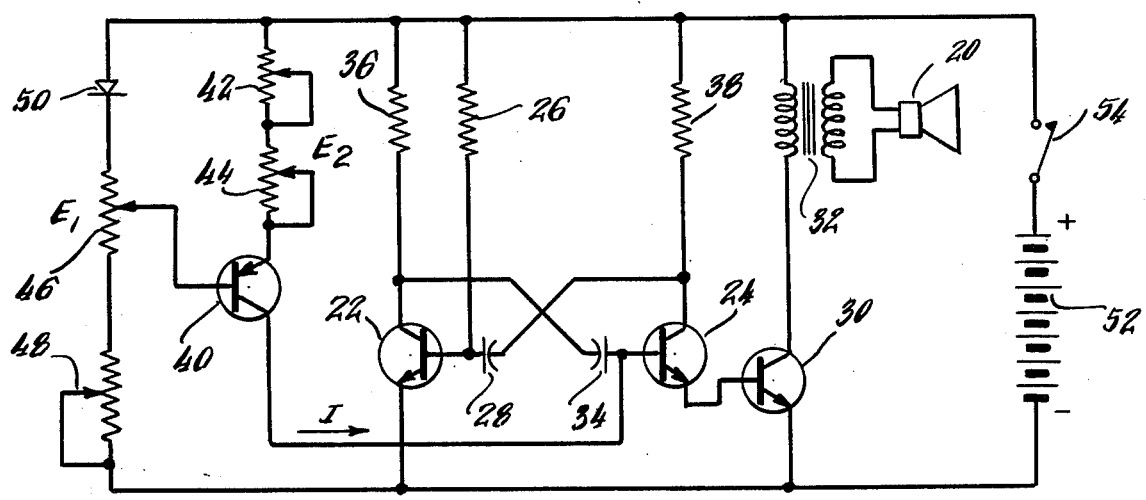
FIG. 2 is a simplified schematic diagram of one form of circuit which may be utilized for carrying out the invention illustrated in the block diagram of FIG. 1.

FIG. 2 shows a simplified circuit which is suitable for performing the functions of the block diagram in FIG. 1. It will be evident to those skilled in the art that the circuit shown in FIG. 2 functions to produce essentially what is required in the invention as described in the equation set out hereinbefore and in the block diagram of FIG. 1. However, the principles of the invention may employ other types of circuitry.

Referring now to FIG. 2, a current-controlled astable multivibrator is provided, having transistors 22 and 24 which form the basic elements thereof. A resistor 26 and a capacitor 28 form the basic off-time constant of transistor 22, which also provides the on-time for transistor 24. The emitter current of transistor 24 provides the base current drive for a drive transistor 30. Accordingly, the on-time for the drive transistor 30 is determined by the time constant of resistor 26 and capacitor 28, which is made approximately equal to the output duration of the exhaust pulses of the typical engine. A transformer 32 couples the output of the drive transistor 30 to drive the speaker 20. A capacitor 34 is coupled between the collector of transistor 22 and the base of transistor 24 for controlling the repetition rate of the multivibrator. During the on-time of transistor 24 and 30 the charge on capacitor 34 is effectively dumped through the saturated conditions of transistors 24 and 30. Capacitor 34 is recharged during the off-time transistors 24 and 30, and the repetition rate or frequency is proportional to its charging current. Resistors 36 and 38 are connected to the collectors of transistors 22 and 24 respectively, and provide collector loads for the multivibrator circuit.

The charging current for the capacitor 34 is the collector current of a transistor 40 which controls the multivibrator. Transistor 40 is a high gain transistor, in which the collector current is essentially the same as the emitter current. A pair of potentiometers 42 and 44 are connected to the emitter of transistor 40 to control the emitter current of transistor 40. A voltage divider consisting of potentiometers 46 and 48 are connected to the base of transistor 40 for controlling the base voltage thereof. Since the voltage of the emitter follows the base voltage, the voltage divider formed by the resistance of potentiometers 46 and 48 will cause the charging current to vary proportionately to the voltage developed on potentiometer 46. A diode 50 is connected between the potentiometers 46 and 42 to offset and temperature-compensate the voltage drop developed at the base-emitter junction of transistor 40.

In accordance with the present invention, assuming that potentiometer 46 is assigned the function of input voltage $E_1$, it is possible to obtain a zero repetition rate with the slider of potentiometer 46 at the junction of diode 50 and potentiometer 46 at one extreme, and maximum rated current, which range is made adjustable by means of potentiometer 48. With potentiometer 44 given the function of input voltage $E_2$, which determines the percentage of current change for any value of $E_1$ or slider position of potentiometer 46, maximum pitch for a given setting of potentiometer 46 occurs when the slider of potentiometer 44 is at the junction between potentiometers 42 and 44. This would correspond to zero speed of the craft whose speed is being measured. Maximum speed at the other end of the control reduces the maximum decrease in current, hence a lower pitch. Potentiometers 48 and 42 interact to provide for range and calibration of rpm and mph on potentiometers 46 and 44, respectively. Power for the circuit is provided by a battery 52, activated by a switch 54.

It will be evident that the above described instrument requires no physical contact between the measuring instrument and the source provided by the engine being measured. As long as the source can be heard, even at a great distance, its rpm and/or miles per hour can be measured. This is done by listening to the source and tuning the oscillator to emanate a sound which matches the pitch of the sound coming from the source in the case of the measurement of the rpm, or matching the pitch of the source as it approaches the observer and then matching the pitch of the source as it moves away from the observer and reading the miles per hour directly from the instrument. The rpm or miles per hour can be measured from a single position with this small, portable instrument which requires no elaborate time traps to be placed at fixed intervals to measure miles per hour.

Figure 3:
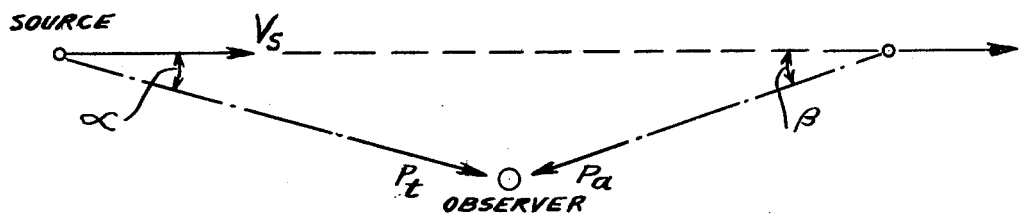
FIG. 3 is an explanatory diagram illustrating positions of the sound source and the observer.

As will be seen from FIG. 3, it is observed in practice that it is not possible to have the source which is being measured in the direct line of travel with that of the observer, and that generally a measurement is made in the manner shown in FIG. 3. It will be observed that this will, in effect, provide a cosine error for which no provision for correction is made in the present invention. This is due to the fact that as long as the subtended angles between the actual line of travel and that of the direction of the sound is small, then the error is too small to bother with, since the cosine of angles less than 8° approach unity within 1% error, which is probably within the accuracies of instruments of this type, making correction unnecessary.

With respect to accuracies and interference levels, the only limitations on the instrument are actually those of the observer himself. As long as an observer can distinguish the sound of his engine on which measurements are to be remotely made, interference will be no problem, and the accuracy will be limited only by the observer himself and his perception of what he is hearing. As long as the user can identify the particular engine through the use of his senses, he can match the pitch, thus providing a useful tool which no other simple instrument can achieve.

Since other modifications and changes, varied to fit particular operating requirements and environments, will be apparent to those skilled in the art, the invention is not considered limited to those chosen for purposes of disclosure, and covers all changes and modifications which do not constitute departures from the true spirit and scope of this invention.

What I claim is:

1. A remote speedometer-tachometer for measurement by an observer of the speed of a craft and/or revolutions per minute of any type of engine mounted in said craft which produces characteristic audible output pulses therefrom, comprising in combination
    (a) a first adjustable and settable voltage related to pitch of an engine or other source with the sound moving toward the observer,
    (b) a second adjustable and settable voltage related to pitch of an engine or other source with the sound moving away from the observer,
    (c) multiplier means having said first and second voltages coupled thereto for modulating said first voltage by said second voltage,
    (d) oscillator means for generating outputs which are narrow in duration,
    (e) means for coupling the outputs of said multiplier means to said oscillator means for controlling the output of said oscillator, and
    (f) output transducer means coupled to the output of said oscillator means whereby the observer by appropriately adjusting said first and second voltages can match the output of said transducer with the sound from said engine and the settings of said first and second voltages being calibrated to provide the speed of the craft and/or RPM measurements for the engine mounted in the craft.

2. The remote speedometer-tachometer set forth in claim 1 having means for setting said second voltage to a fixed value with said first voltage calibrated for revolutions per minute so that on matching of sounds from the engine pulses and the output of said transducer by adjustment of said first voltage a reading of revolutions per minute is provided by said tachometer.

3. The remote speedometer-tachometer set forth in claim 1 having first means for adjusting said first voltage source so the pitch from the engine being measured is matched to the output of said transducer when the sound is moving toward the observer and second means for adjusting said second voltage to the pitch of the engine being measured as the sound is moving away from the observer, said second means being appropriately marked to indicate speed.

4. A method of remotely measuring the speed of a craft containing an engine having a characteristic audible output using an oscillator for producing an audible output which simulates the characteristic audible output of the engine being measured by an observer, comprising the steps of
    (a) matching the pitch of the output of said oscillator which the pitch of the audible output of the engine in a craft whose speed is being measured as sound from the engine is moving toward the observer,
    (b) matching the pitch of the audible output of the engine being measured as the sound from the engine is moving away from the observer, and
    (c) ratioing the pitch obtained in steps (a) and (b) to determine the speed of the craft containing the engine.

* * * * *